(No Model.)
B. F. STAGGS.
COFFEE POT.
No. 297,190. Patented Apr. 22, 1884.
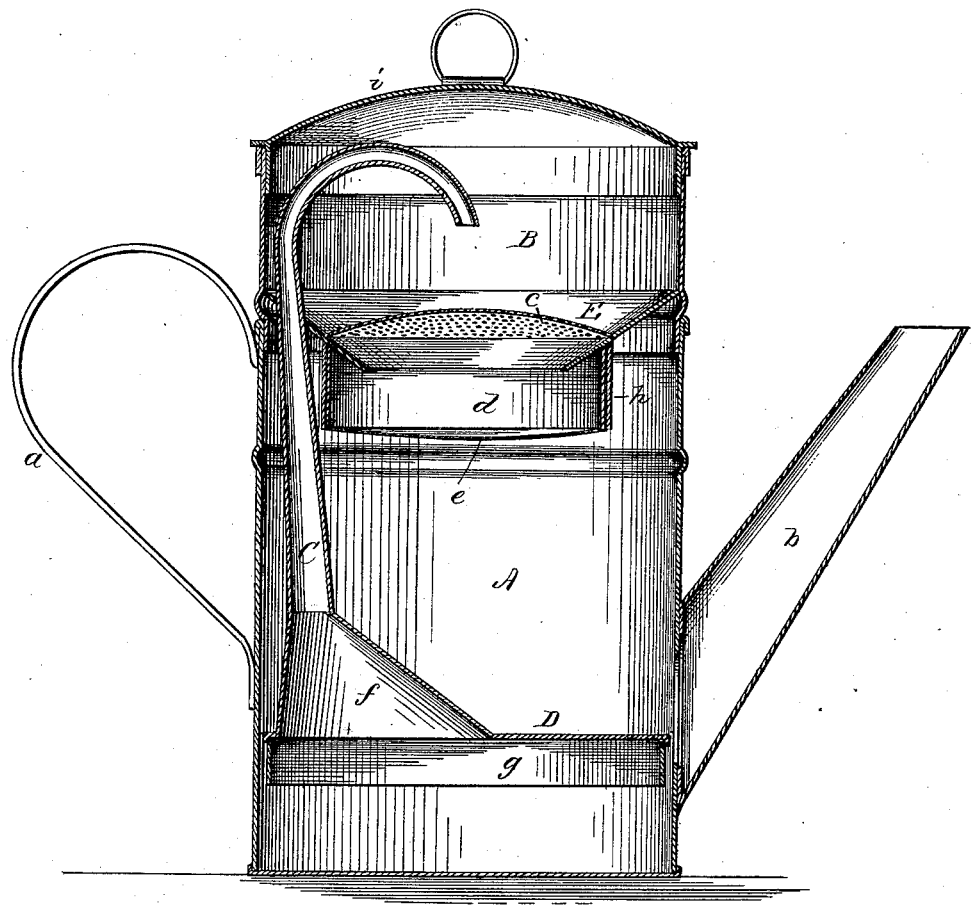
WITNESSES
F. L. Ourand,
N. E. Oliphant,
INVENTOR
Benjaman F. Staggs
By Chas. H. Fowler
Attorney

UNITED STATES PATENT OFFICE.

BENJAMAN F. STAGGS, OF HENDERSONVILLE, NORTH CAROLINA.

COFFEE-POT.

SPECIFICATION forming part of Letters Patent No. 297,190, dated April 22, 1884.

Application filed August 16, 1883. (No model.)

*To all whom it may concern:*

Be it known that I, BENJAMAN F. STAGGS, a citizen of the United States, residing at Hendersonville, in the county of Henderson and State of North Carolina, have invented certain new and useful Improvements in Coffee-Pots; and I do hereby declare that the following is a full, clear, and exact description of the same, reference being had to the annexed drawing, making a part of this specification, and to the letters and figures of reference marked thereon.

The present invention has relation to that class of coffee-pots provided with a receptacle for the ground coffee, and a false bottom having an upwardly-extending tube projecting into said receptacle, whereby a continuous current of water is obtained, which passes through the coffee to extract therefrom the entire strength.

The invention therefore consists in the several details of construction whereby the process of making the coffee is rendered more effective and the arrangement of parts greatly simplified, as will be hereinafter described, and subsequently pointed out in the claim.

In the accompanying drawing, which is a sectional side view of a coffee-pot with my invention applied, A represents the body of the coffee-pot, provided with the usual handle, *a*, and spout *b*.

Fitting within the top of the coffee-pot is a receptacle, B, provided with a funnel-shaped vessel, E, having connected thereto a convex perforated bottom, *c*. The convexity of the bottom *c* keeps the grounds from settling together and stopping the flow of water through the bottom, this being an additional and important feature of said bottom, while the vessel E is made funnel shape for the additional purpose of throwing the water to the center.

The vessel E is provided with a depending ring, *d*, for connecting thereto a cloth strainer, *e*, held in position on the ring by a circular band, *h*. This vessel has a suitable cover, *i*, which also fits the body A of the coffee-pot when said vessel is not in use. A false bottom, D, having flange *g*, is held some distance above the bottom of the coffee-pot, and is formed with a flaring extension, *f*, from which projects a tube, C, having a goose-neck at its upper end, arranged directly over the perforated bottom *c*. The upper end of the tube C passes through the funnel-shaped vessel E, and is rigidly secured thereto, so that by removing the receptacle B for the coffee the tube and false bottom are removed with it, and by thus connecting them together the false bottom is held suspended from contact with the bottom of the coffee-pot. As the water begins to boil it will rise upward through the tube C and enter the receptacle B and thoroughly permeate the ground coffee, passing in its course through the perforated bottom *c*, and thence through the cloth strainer *e*, to be again passed through the coffee in like manner, thus keeping up a continuous current of hot water through the ground coffee, while the cloth strainer prevents any dregs from being carried with it.

In addition to the perforated bottom *c*, the cloth strainer *e* is considered of great importance, freeing, as it does, the liquid from any dregs or foreign substance which would not otherwise be intercepted by the perforated bottom, thus rendering the liquid coffee extremely clear and of great strength, while the aroma is entirely preserved, and consequently rendering the coffee more palatable—features in the process of making coffee that are absolutely essential.

Having now fully described my invention, what I claim as new, and desire to secure by Letters Patent, is—

In a coffee-pot, the combination, with a false bottom provided with a suitable tube for the passage of the boiling water, of a receptacle for the coffee, into which the upper end of the tube extends, said receptacle having a funnel-shaped vessel and a convex perforated bottom, and a cloth strainer connected to a ring depending from the vessel, substantially as and for the purpose set forth.

In testimony that I claim the above I have hereunto subscribed my name in the presence of two witnesses.

BENJAMAN F. STAGGS.

Witnesses:
CHARLES SMOSSKY,
W. B. JUSTUS.